United States Patent [19]

Aoyama

[11] Patent Number: 4,836,683
[45] Date of Patent: Jun. 6, 1989

[54] KNEADING MACHINE
[75] Inventor: Michishige Aoyama, Aichi, Japan
[73] Assignee: Kabushiki Kaisha Toshiba, Japan
[21] Appl. No.: 165,604
[22] Filed: Mar. 8, 1988
[30] Foreign Application Priority Data
Mar. 11, 1987 [JP] Japan .............................. 62-35398[U]
[51] Int. Cl.$^4$ .............................. B28C 1/16; B29B 1/06
[52] U.S. Cl. .......................................... 366/98; 99/348; 366/601
[58] Field of Search .................. 99/348; 366/69, 96, 366/97, 98, 99, 601; 426/549, 551, 504, 506
[56] References Cited

U.S. PATENT DOCUMENTS

| 4,202,257 | 5/1980 | Masuda | 99/348 |
| 4,538,509 | 9/1985 | Kamiuchi | 366/98 |
| 4,649,810 | 3/1987 | Wong | 99/348 |
| 4,747,690 | 5/1988 | Hayashi | 366/98 |

FOREIGN PATENT DOCUMENTS 57-155081 9/1982 Japan .

Primary Examiner—Robert W. Jenkins
Attorney, Agent, or Firm—Cushman, Darby & Cushman

[57] ABSTRACT

A kneading machine includes a kneading device for kneading a main material and an ancillary material together that are contained separately therein, a timer device for starting a kneading operation, by actuating the kneading device in accordance with a set time, a start device for actuating the timer device to start a time count, a cancel device for overriding the timer device and the start device, and a control device. The control device enables the cancel device to function for a prescribed period after the start device is operated without the time device being set. The kneading operation can thus be reset during the prescribed period, if the start device is operated by mistake.

20 Claims, 3 Drawing Sheets

KNEADING MACHINE

BACKGROUND OF THE INVENTION

1. Field of the Invention

The present invention relates, in general, to a kneading machine. More particularly, the invention relates to a kneading machine for automatically making bread.

2. Description of the Prior Art

Automatic bread making machines have, in general, three operating steps carried out automatically by a microcomputer. The first step is a kneading step in which main material, consisting of wheat flour mixed with sugar and salt, and water in a container is kneaded together with ancillary material, consisting of yeast, etc., to form bread dough. The second step is a fermentation step in which the bread dough is fermented. The third step is a baking step in which the bread dough is baked after the fermentation has finished. These steps are started and carried out automatically by pressing a start key, which constitutes the start element of a central device including the microcomputer. It typically takes about three hours to make bread from the start of the kneading step to the end of the baking step.

Recently, it has become desirable for people to obtain freshly-baked bread for breakfast or other meals. Therefore, a bread-making machine has been developed wherein the central device, including the microcomputer, has a timing function so that the desired bread making time can be set into the central device. This is accomplished by operating a timer key constituting a timer operating element of the central device, and pressing the start key, for example, at night. The bread making operation then starts about three hours before the desired time for obtaining freshly-baked bread.

The main material (wheat flour, mixed with sugar and salt, and water) and the ancillary material (yeast) must be placed in the container the preceding night when freshly baked bread is desired at breakfast. However, when the yeast comes into contact with the water, fermentation starts, and if the mixture of the yeast and the water is left alone for a long time before the kneading step, too much fermentation takes place. As a result the dough is denatured. Conventionally, therefore, the water and the yeast were separately maintained, so that they did not come into contact. Various schemes were adopted for mixing the water and yeast together at the start of the kneading step, for example, by using the rotation of a drive motor employed for kneading.

An example of such an automatic bread-making machine is disclosed in Japanese Utility Model Laid-Open Publication No. 57-155081, filed on Nov. 29, 1982 in the name of Shinji Takahagi. The automatic bread-making machine disclosed therein has a timer. Water is placed in a container having a valve which prevents the water from coming into contact with the yeast.

When the timer count reaches a set value, the valve is opened to mix the water with the yeast and the drive motor employed for kneading is driven, so that the bread-making operation starts. However, in these prior art bread-making machines, in spite of the above-mentioned various schemes, if a user pressed the start but forgot to operate the timer key, the drive motor for kneading would operate immediately, mixing together the separated water and yeast. In other words, these prior art bread-making machines have the possibility of the water and the yeast being mistakenly kneaded together at the wrong time.

SUMMARY OF THE INVENTION

It is an object of the present invention to provide a kneading machine in which main material and ancillary material can be positively prevented from being mixed together before the actual desired time of kneading.

To accomplish this object, the present invention provides a kneading machine, comprising a kneading device for kneading the main material and the ancillary material, only at the proper time. A timer device for properly starting the kneading operation by actuating the kneading device in accordance with a set time, is also provided. The invention further includes a start device for actuating the timer device to start a timed count, a cancelling device for resetting the timer device and the start device, and a central device. The central device enables the cancelling device to function for a prescribed period after the start device is operated without setting the timer device.

BRIEF DESCRIPTION OF THE DRAWINGS

The present invention is best understood with reference to accompanying drawings in which.

DETAILED DESCRIPTION OF THE PREFERRED EMBODIMENT

Referring to the accompanying drawings, an embodiment of the present invention will be described.

Figure 2:
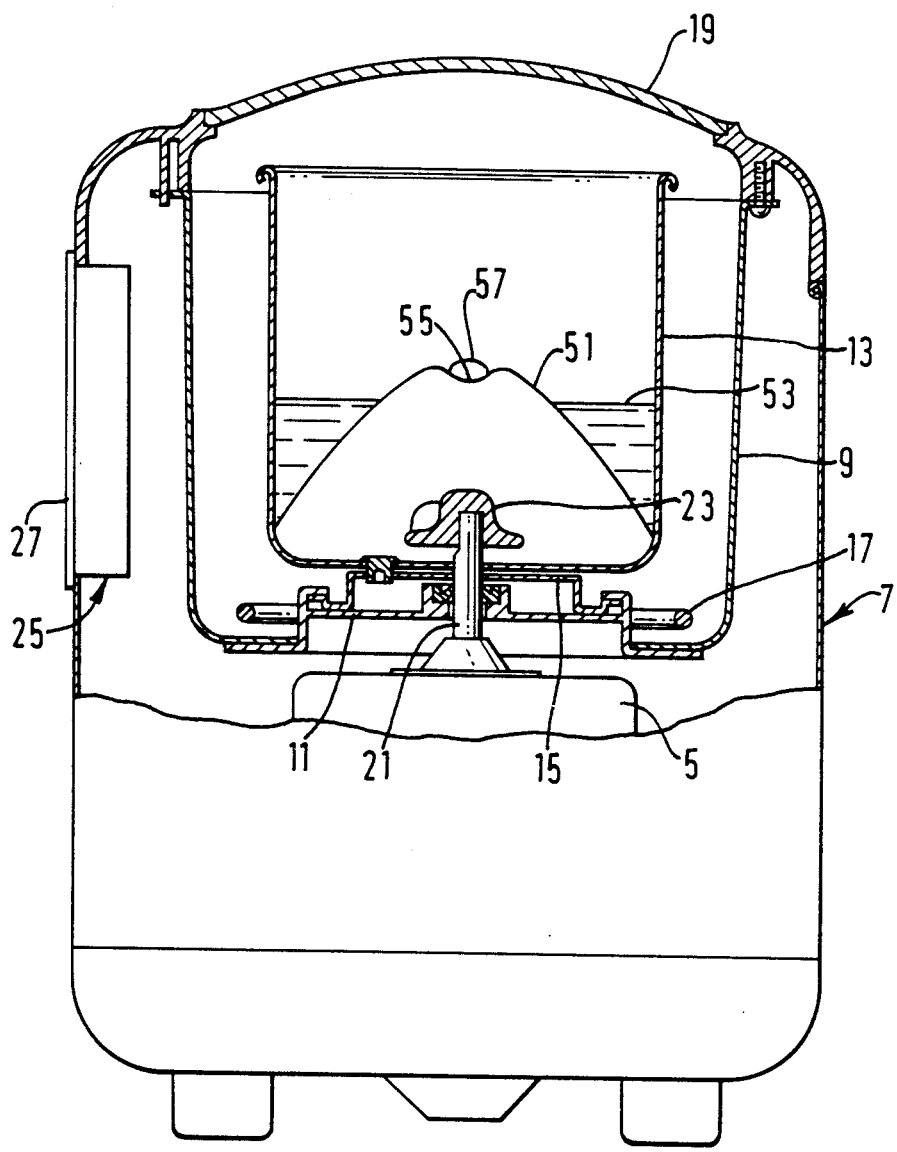
FIG. 2 is a perspective diagram illustrating the embodiment of the present invention.
Figure 3:
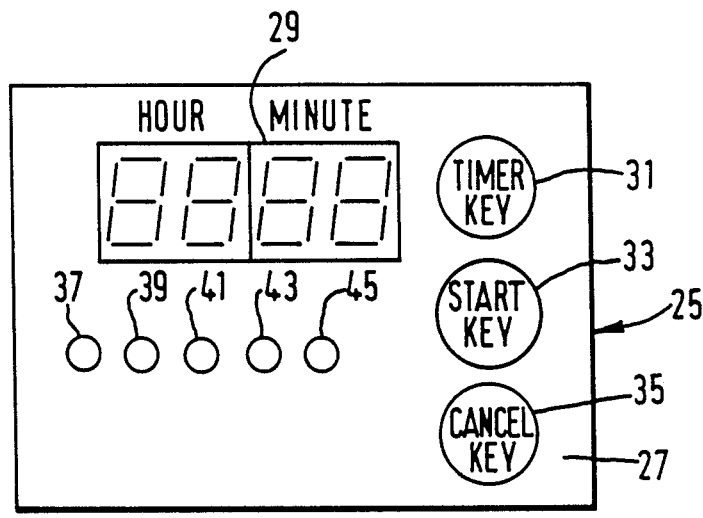
FIG. 3 is a partial diagrammatic view illustrating the control board of the present invention.

The overall construction will be described with reference to FIG. 2 and FIG. 3. Drive motor 5 for kneading is arranged in the bottom of outer casing 7. Inner casing 9 is arranged within outer casing 7 and carrier 11 is fitted at the bottom thereof. Cylindrical container 13 closed at its bottom end is releasably held within inner casing 9 by bayonet-type engagement of carrier 11 and engagement element 15 mounted on the bottom of container 13.

Heater 17, such as a sheath heater, is arranged at the bottom of and inside inner casing 9. Removable lid 19 closes the upper opening of outer casing 7. Rotary shaft 21 projects upwards from drive motor 5, passes through the middle of carrier 11 and engagement element 15, and projects into container 13. Rotary shaft 21 is provided, at its end projecting into container 13, with kneading vane 23.

Central device 25 is mounted on the side wall of outer casing 7. As is shown in FIG. 3, central device 25 is equipped with operating panel 27, which is provided with display device 29 for displaying hours and minutes, timer key 31, start key 33, cancel key 35, light-emitting diode 37 for indicating the timer action, light-emitting diode 39 for indicating the kneading operation, light-emitting diode 41 for indicating the fermentation operation, light-emitting diode 43 for indicating the baking operation, and light-emitting diode 45 for indicating the completion of the operating cycle.

Figure 1:
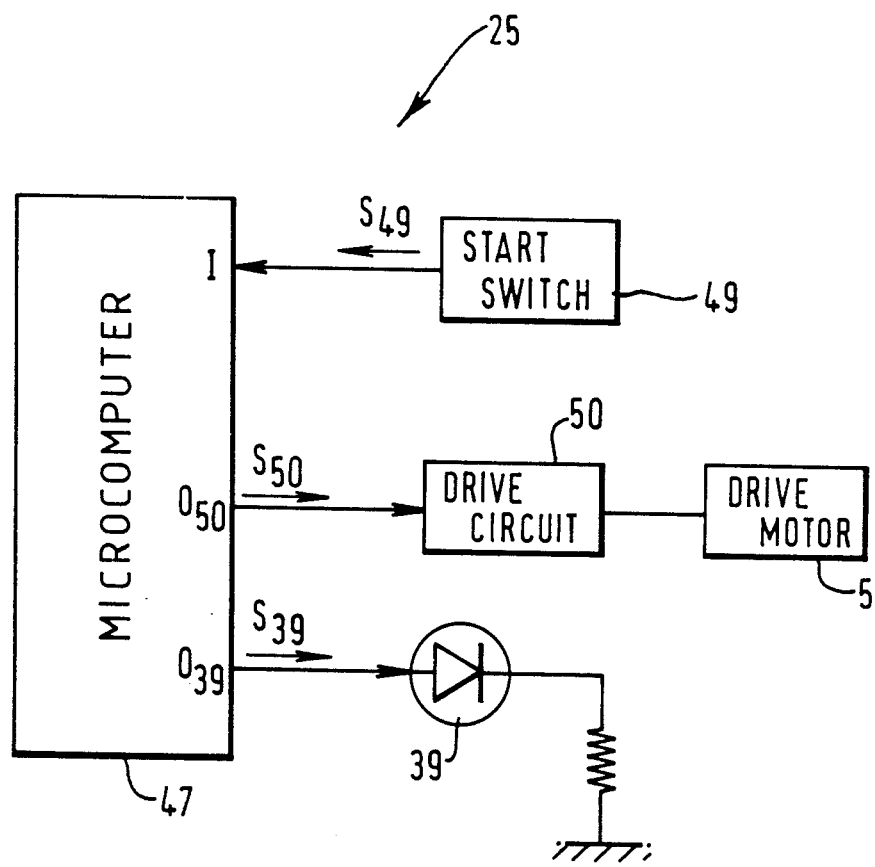
FIG. 1 is a block schematic diagram illustrating a part of a central control circuit of the present invention.

The electrical construction of central device 25 will now be described with reference to FIG. 1. FIG. 1 shows only the parts relating to the kneading operation step, and the other parts relating to the other operation steps are not shown. Microcomputer 47 is provided for controlling the bread making operation and also for timing the operation.

Microcomputer 47 receives at input port I thereof start signal S49 which is output from start switch 49 when start key 33 is pressed on, and outputs drive signal S50 from output port O50 thereof to drive circuit 50. Drive motor 5 is driven by drive circuit 50, when drive signal S50 is fed thereto. Simultaneously, microcomputer 47 also outputs display signal S39 from output port O39 thereof to light-emitting diode 39, for lighting up light-emitting diode 39 to indicate operation of the kneading step.

Figure 4:
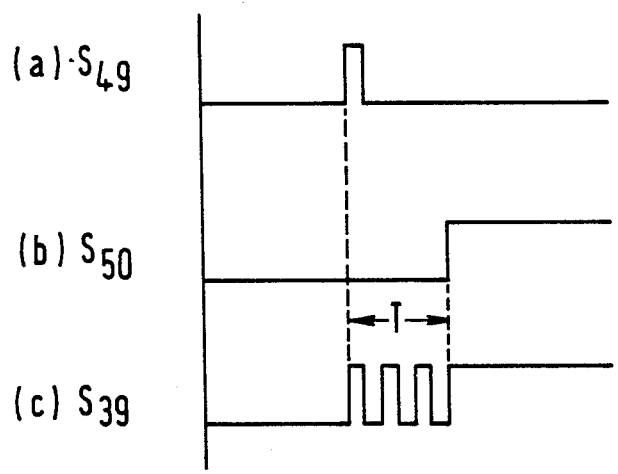
FIG. 4 is a graphical representation illustrating the timed operation of the present invention.

The operation of an embodiment of this invention will now be described with reference to FIG. 4. Wheat flour 51, as is shown in FIG. 2, mixed with sugar and salt is formed in the shape of a mound or hill accommodated within container 13. Water 53 is disposed around the periphery of this mound shaped wheat flour 51. A depression 55 is formed at the top of the mound of wheat flour 51, and yeast 57 is held in this depression 55. As a result, water 53 and yeast 57 are accommodated separately and will not come into contact.

When timer key 31 is operated to set the required time point, for baking the bread, in the timer function part of microcomputer 47, the set hour and minutes are displayed on display device 29 by microcomputer 47. Subsequently, when start key 33 is operated, the timer function part of microcomputer 47 starts a timing action, and microcomputer 47 also causes light-emitting diode 37, provided for indicating the timer action, to be lit. When the part of microcomputer 47 that has the timing function counts a prescribed time, for example, three hours in advance of the set time-point, the bread making operation is started.

The bread making operation consists of the several following described steps, which are automatically carried out. The first step is the kneading step, in which wheat flour 51, water 53 and yeast 57 are kneaded together by rotating kneading vane 23 by driving drive motor 5 to form the dough. This kneading step is followed by the fermentation step wherein the dough is heated at low temperature, for example at 32.5° C., by sheath heater 17 to allow the dough to ferment. The fermentation step is followed by the baking step in which, after having been fermented, the dough is baked at high temperature, for example at 140° C., by sheath heater 17, to complete the production of freshly baked bread at the set time. The kneading step, the fermentation step, the baking step, and completion of the cycle are signalled by successively lighting the corresponding light-emitting diodes 39, 41, 43 and 45, by microcomputer 47.

If start key 33 is operated without operating timer key 31 to set the time, when wheat flour 51, water 53 and yeast 57 are in the set condition shown in FIG. 2, the operation will be as follows. As shown in FIG. 4, when start key 33 is pressed on, start signal S49 becomes high-level. Since timer key 31 has not previously operated, microcomputer 47 outputs display signal S39 which is alternately high-level and low-level, upon receiving start signal S49, instead of outputting high-level drive signal S50 immediately. This causes kneading display light-emitting diode 39 to light intermittently.

Subsequently, after the lapse of a prescribed time, microcomputer 47 outputs high-level drive signal S50, causing the drive motor 5 to be driven so that the bread making operation is commenced as described above. The time from when start signal S49 becomes high-level up to when drive signal S50 becomes high-level, is the waiting time T, for example, the waiting time T can be two seconds. During this waiting time T, light-emitting diode 39 is lit intermittently to indicate to the user that start key 33 has been pressed on without operating timer key 31. So, if cancel key 35 is operated during this waiting time T, microcomputer 47 cancels the input of start signal S49 and stops the timing action of the waiting time T, preventing subsequent starting of the bread making operation.

If cancel key 35 is not operated during this waiting time T microcomputer 47 does not cancel the input of start signal S49 and makes the display signal S39 go to a continuously high-level, at the same time as it makes the drive signal S50 high-level, so that light-emitting diode 39 is lit continuously to indicate that the kneading operation step has started.

As should be well understood by those skilled in the art from the above description, if start key 33 is pressed on without operating timer key 31, in the set condition in which wheat flour 51, water 53 and yeast 57 are accommodated in the container 13, drive motor 5 is not operated but kneading display light-emitting diode 39 is lit intermittently to indicate that the machine is in the waiting period T. Therefore, even though start key 33 is pressed on mistakenly without operating timer key 31, it is still possible to cancel the bread making operation by operating cancel key 35 during the waiting time T. Accordingly, the desired object of obtaining a freshly baked bread the next morning by means of a timer function can be achieved, while positively preventing water and yeast from being mixed together before they should be.

Although in the above embodiment water 53 and yeast 57 were kept separate by placing yeast 57 in depression 55 at the top of the mound of wheat flour 51, an alternative possibility is to arrange for yeast 57 to fall down into container 13 by utilizing the vibrations produced by drive motor 5.

The present invention has been described with respect to a specific embodiment. However, other embodiments based on the principles of the present invention should be apparent to those of ordinary skill in the art. For example, this invention can be applied to all kneading machines wherein unsuitable material would be obtained by mixing together part or all of the main material and an ancillary material before kneading is begun. Such embodiments are intended to be covered by the claims.

What is claimed is:

1. A kneading machine including a main material and an ancillary material to be kneaded while being mixed together, said kneading machine comprising:
   kneading means for kneading the main material and the ancillary material;
   timer means for starting a kneading operation by actuating the kneading means in accordance with a set time;
   start means for actuating the timer means to start a time count;
   cancelling means for resetting the timer means and the start means; and control means for enabling the cancelling means to function for a prescribed period of time after the start means is operated when no operation of the timer means to set the time therein has occurred.

2. A kneading machine according to claim 1 further including display means for indicating the execution of the kneading operation, the display means also indicating the prescribed period for which the cancelling means is operable.

3. A kneading machine according to claim 2, said display means including a light-emitting diode to be lit continuously during the kneading operation and intermittently for the prescribed period for which the cancelling means is operable.

4. A kneading machine according to claim 3, said timer means including a setting switch for setting the time therein and a time display means for indicating the set time.

5. A kneading machine according to claim 4, said start means including a start switch to be pressed on, and the cancelling means includes a cancel switch to be pressed on, the start switch, the cancel switch, the setting switch, the time display means and the light-emitting diode being mounted on a control plate installed thereon.

6. A kneading machine according to claim 1, said kneading means including a container releasably held therein for the main material and the ancillary material to be contained together, the main material being kept separate from the ancillary material.

7. A kneading machine according to claim 6, said kneading means further including a drive motor having a rotary shaft projecting into the container, at the projecting end thereof a kneading vane being releasably provided.

8. A kneading machine according to claim 1 further including heater means for a bread making operation, consisting of a kneading step, a fermentation step and a baking step, in the kneading step the main material and the ancillary material being kneaded to form a dough, in the fermentation step the dough being heated by the heater means, in the baking step said heater means being provided for baking the fermented dough.

9. A kneading machine according to claim 8 further including display means for indicating the execution of the steps of the bread making operation, respectively, the display means also indicating the prescribed period for which the cancelling means is operable.

10. A kneading machine according to claim 9, said display means including: light-emitting diodes to be lit continuously in accordance with the steps of the bread making operation respectively; and a light-emitting diode to be lit continuously for indicating the completion of the bread making operation, at least one of the light-emitting diodes being lit intermittently for the prescribed period for which the cancelling means is operable.

11. A kneading machine according to claim 10, said timer means including a setting switch for setting time therein; a light-emitting diode for indicating the timer action; and a time display means for indicating the set time.

12. A kneading machine according to claim 11, said start means including a start switch, and said cancelling means including a cancel switch, each one of the setting switch, the start switch, the cancel switch, the time display means and the light-emitting diodes being mounted on a control plate.

13. A kneading machine according to claim 8, said kneading means including a container releasably held therein for holding the main material, in the shape of a mound, and for holding the ancillary material together, the main material being constituted of wheat flour and water, the ancillary material being constituted of yeast, the yeast and the water being kept separate with the yeast being placed into a depression at the apex of the mound of wheat flour.

14. A kneading machine according to claim 13, said kneading means including a drive motor having a rotary shaft projecting into the container, at the projecting end thereof a kneading vane being releasably provided.

15. A kneading machine according to claim 8 further including display means for indicating the execution of each of the steps, respectively, and the completion of the bread making operation.

16. A kneading machine according to claim 15, said display means including light-emitting diodes to be lit continuously in accordance with each of the steps and the completion of the bread making operation, respectively.

17. A kneading machine according to claim 16, said timer means including a setting switch for setting the time therein, a light-emitting diode to be lit continuously for indicating the timer action and a time display means for indicating the set time, at least one of the light-emitting diode and the time display means being lit intermittently for the prescribed period for which the cancelling means is operable.

18. A kneading machine according to claim 17, said start means including a start switch, and said cancelling means including a cancel switch, each one of the setting switch, the start switch, the cancel switch, the time display means and the light-emitting diodes being mounted on a control plate.

19. A method for executing a kneading operation at a set time in a kneading machine having a timer, and a main material and an ancillary material to be kept separate from each other until the kneading operation is started, said method comprising the steps of:
   setting the timer for the set time;
   starting a time count of the timer;
   enabling a cancellation of the kneading operation for a prescribed period after starting the time count without the timer being set; and
   executing the kneading operation for kneading the main material and the ancillary material when the time count has reached the set time.

20. A method for executing a kneading operation at a set time in a kneading machine having a timer, and a main material and an ancillary material to be kept separate from each other until the kneading operation is started, said method comprising the steps of:
   setting the timer for the set time;
   starting a time count of the timer;
   enabling a cancellation of the kneading operation for a prescribed period after starting the time count without the timer being set;
   indicating the prescribed period for which the cancellation of the kneading operation is possible; and
   executing the kneading operation for kneading the main material and the ancillary material when the time count has reached the set time.

* * * * *